United States Patent
Golser

[11] 3,790,900
[45] Feb. 5, 1974

[54] GAS LASER MIRROR ASSEMBLY
[75] Inventor: Hans Golser, Munich, Germany
[73] Assignee: Siemens Aktiengesellschaft, Berlin and Munich, Germany
[22] Filed: Nov. 29, 1971
[21] Appl. No.: 203,018

Related U.S. Application Data
[63] Continuation of Ser. No. 848,322, Aug. 7, 1969, abandoned.

[52] U.S. Cl................................. 331/94.5, 350/298
[51] Int. Cl. ........ H01s 3/02, H01s 3/22, H01s 3/05
[58] Field of Search ............ 331/94.5; 350/298, 310

[56] References Cited
UNITED STATES PATENTS
3,566,302  2/1971  Rhodes .............................. 331/94.5
3,568,088  3/1971  Dessus ............................... 331/94.5

*Primary Examiner*—Ronald L. Wibert
*Assistant Examiner*—R. J. Webster
*Attorney, Agent, or Firm*—Hill, Sherman, Meroni, Gross & Simpson

[57] ABSTRACT

A gas laser tube structure for generating a laser output comprising an elongated, evacuated envelope containing a gas suitable for producing a glow discharge with the closed ends of said envelope being made non-reflective by cutting them at Brewster's angle, hollow tubular members fixed at each end of said envelope, and reflective mirrors attached to the other end of said tubular members which define a resonant cavity of gas-tight construction.

The gas laser preferably contains a gas in the resonant cavity which does not absorb the laser radiation and the reflective mirrors prior to sealing are adjustable with respect to the tubular member whereby optimum laser output is achieved. Also covers a method of making said gas laser tube structure by providing said envelope with a gas and closing it at its ends, placing around the non-reflective ends of said envelope a tubular member in a fixed manner, energizing the laser tube, fixing an end-piece containing a reflective surface to the other end of said tubular member during the energizing step, adjusting the end-piece with its reflective surface until maximum laser output is reached and then sealing said end-piece in properly adjusted condition to said tubular member in a gas-tight manner.

3 Claims, 1 Drawing Figure

PATENTED FEB 5 1974 3,790,900
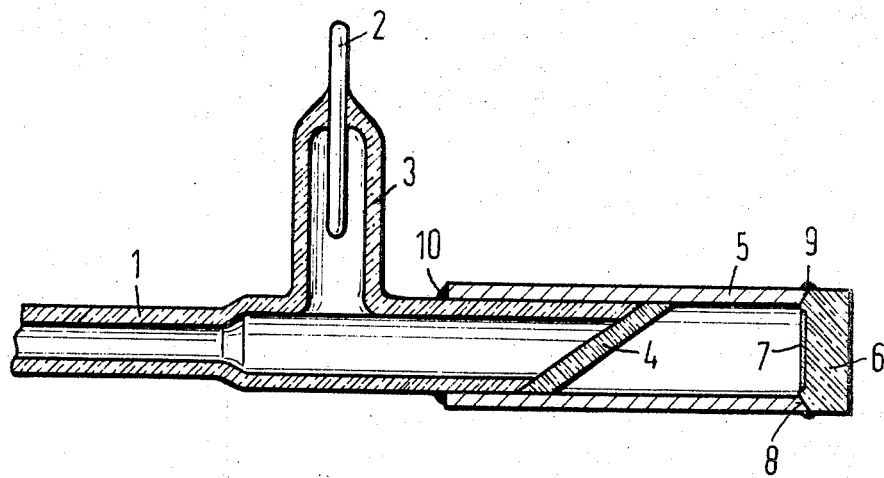
INVENTOR
Hans Golser
BY
ATTYS.

GAS LASER MIRROR ASSEMBLY

This is a continuation of application Ser. No. 848,322, filed Aug. 7, 1969, now abandoned.

A laser is a quantum electronic device which can stimulate a substance in a particular excited energy state to emit radiation of the same frequency and in phase with the exciting radiation. The incident radiation beam is thus amplified and produces an intense, highly directional, coherent beam of electro-magnetic radiation at a precisely defined frequency.

One particular type of laser is a gaseous laser. A gaseous laser usually includes a container in which a suitable gas or gas mixture can provide a light output as a result of a stimulated emission. Briefly, according to the theoretical operation of the laser, a gas molecule is exited or raised to a higher energy state, in which state it can be stimulated by an outside photon to release a photon, in the course of which the molecular reverts to a lower state. Generally, in order to excite the gas molecules, radio frequency energy is applied by means of electrodes positioned at the tube envelope. The applied RF excites any free electrons in the gas, causing them to collide with the gas molecules whereby the gas molecules have their energy states raised. Thereafter, the excited molecules may be bombarded with photons from a stimulating light source which may be external or may be regeneratively circulated spontaneous emission.

In the usual case the opposite ends of the envelope the gas laser are formed of a transparent material suitable for laser light. The ends are usually highly polished and angularly disposed in such a manner that a line normal to the surface of the plate window maintains Brewster's polarization angle with respect to the longitudinal axis of the cylinder cathode. The gas laser also contains a pair of reflectors arranged at the outer ends of the laser tube structure.

While lasers containing integrated mirrors are known they do have one serious drawback in that they cannot be adjusted when the laser tube is ignited or, if so, only with great difficulty. That is, once the mirrors are fixed they cannot be adjusted properly in order to insure that the laser forms to its optimum capacity.

It therefore becomes an object of the invention to provide a gas laser with integrated mirrors which may be simply adjusted when the discharge tube is in a state of ignition.

Another object of the invention is to provide a gas laser of such a construction that not only are the reflecting mirrors adjustable, but after being permanently fixed are protected from the environment.

Another object of the invention is to provide a laser beam structure of such a construction that it can be advantageously operated at various altitudes such as in airplanes without resort to constant adjustment of the integrated mirrors.

A still further object of the invention is to provide a method of preparing the just-described gas laser.

Further objects, features and advantages of the invention will be readily apparent from the following description of certain preferred embodiments thereof, taken in conjunction with the accompanying drawing although variations and modifications may be effected without departing from the spirit and scope of the novel concepts of the disclosure, and in which:

The FIGURE shows a plan view of a gas laser tube designed in accordance with the principles of the instant invention.

Broadly speaking the gas laser tube of the invention may be defined as a gas laser tube structure for generating a laser output comprising an elongated, evacuated envelope containing a gas suitable for producing a glow discharge with the closed ends of said envelope being made non-reflective by cutting them at Brewster's angle, hollow tubular members fixed at each end of said envelope, and reflective mirrors attached to the other end of said tubular members which define a resonant cavity of gas-tight construction.

The gas laser preferably contains a gas in the resonant cavity which does not absorb the laser radiation and the reflective mirrors prior to sealing are adjustable with respect to the tubular member whereby optimum laser output is achieved. Also covers a method of making said gas laser tube structure by providing said envelope with a gas and closing it at its ends, placing around the non-reflective ends of said envelope a tubular member in a fixed manner, energizing the laser tube, fixing an end-piece containing a reflective surface to the other end of said tubular member during the energizing step, adjusting the end-piece with its reflective surface until maximum laser output is reached and then sealing said end-piece in properly adjusted condition to said tubular member in a gas-tight manner.

The gas laser of the invention is best constructed by first providing the above-discussed envelope with its non-reflective ends so prepared by disposing them at Brewster's angle. Permanently fixed to the ends above the envelope are hollow tubular members, preferably of a slightly larger diameter than the envelope so that they can be fitted around the ends of the envelope and permanently fixed thereto. Thus, the tubular members may be glued or cemented to the ends of the discharge tube closed off by the Brewster plates.

At the other end of the tubular members are reflective mirrors which may be suitably adjusted as further discussed below during ignition of the tube until the maximum laser output is realized. Thereafter, the mirrors are fixed in the proper position in a gas-tight manner whereby a resonant cavity is formed for the stimulated radiation. Preferably, this cavity bounded by the tubular member, the Brewster end-plate of the envelope and the mirror is filled with a gas which does not absorb the laser radiation. This helps to protect the mirror surfaces from dust particles, moisture, gases, etc., present in the outer environment and also serves to insure a constant power output of the laser. Further, by this expedient, the UV radiation from the gas discharge which is harmful to the reflective mirrors, particularly when the Brewster plate consists of glass, is substantially prevented from contacting the mirrors by the protective gas presence in the resonant cavity.

The non-absorbing gas filling this chamber has a still further role. Generally, by reason of beam displacement in the refraction of the laser radiation through the Brewster plates due to change of air pressure outside of the discharge vessel the atunement of the laser also changes. This is due to the fact that the change of air pressure also changes the index of refraction. The beam displacement, therefore, will differ according to outer air pressure. However, in the instant invention the influence of outside air pressure is compensated in that the gas pressure in the critical zone between Brewster plates and the mirrors is kept constant. A laser prepared according to the present invention therefore can be advantageously used for operation at various altitudes such as, for example, in airplanes. The usual case prior art lasers have to be continually adjusted with any substantial change in altitude.

One of the key features of the invention lies in the construction of the gas laser such that the mirrors can be adjusted during gas discharge until maximum laser output is achieved. This is best realized by fitting the ends of the tubular member opposite the Brewster's plate with a ground joint. The mirrors which are to be connected to the tubular member have a corresponding spherical grind or ground joint at those places fitting the ends of the tubular member. In this way the mirrors can be simply adjusted as desired. Resort to the ground joints may in some respects be envisioned as a modified ball-in-joint arrangement.

Generally the mirrors, which comprise glass bodies with vaporized-on reflective layers, contain closely ground surfaces in the zone lying on the tubular member with its correspondingly fitted ground surface.

The glass mirrors or reflectors may be of the convocal or near-convocal type or any other type known in the art and should be sufficiently reflective to raise the laser gain to the proper degree.

In essence, the gas laser of the invention can be produced in a simple and facile manner. The tubular members without the mirror ends are first cemented or fixed onto the discharge tube. Thereafter, the laser is ignited, the mirrors are placed on the end of the tubular members, and adjusted until maximum power output of the laser is achieved. The mirror ends are then cemented tight with the tubular member, and are held in the proper position until the adhesion points have fully hardened.

Referring now to the FIGURE there is depicted schematically a typical gas laser tube structure in the invention. There is shown one end section of a laser discharge tube or elongated evacuated, thin wall envelope section 1 which contains a gas suitable for producing a glow discharge. The discharge tube contains a lateral added piece 3 serving for the reception of an electrode 2. The other side of the discharge tube (not represented) contains a corresponding counter-electrode. The two electrodes serve in common for the generation of the gas discharge in the discharge space. The end of the discharge tube 1 is closed off by a so-called Brewster's plate 4. The plate constitutes one closed end of the envelope and is made non-reflective by cutting it at the Brewster's angle. A shell or tubular member 5 projects over the end of the discharge tube and is cemented or glued to the tube at point 10. At the other end of the tubular member 5 there is secured a glass body 6, which has on its inner surface a mirror 7. The annular outer zone 8 surrounding the mirror layer is spherically ground to fit a correspondingly ground surface of the end of the shell or tubular member. By this construction it is possible in a simple manner to adjust the mirror by tilting the glass body 6, through which process the spherical ground surfaces slide over one another. During the adjustment the output power of the laser is continuously measured. Upon reaching the maximal output power the adjusting is ceased and the mirror is cemented gas-tight with the shell or tubular member 5. The mirror is held in the optimum position after proper adjustment until the places of adhesion 9 have hardened or dried.

In a further embodiment of the invention the optimum mirror position is realized by adjusting the shell or tubular member with respect to the discharge tube after first fixing the mirror to the tubular member. Thereafter the shell or tubular member is firmly fixed to the discharge tube by cementing or other means.

I claim as my invention:

1. A gas laser comprising an elongated gas filled discharge tube means having mirror assembly means arranged at opposite ends thereof and forming an optical resonator between said two mirror assembly means, mirror means comprising a mirror mounted on a substrate, said substrate having a spherical grind about its outer area surrounding said mirror, said tube means having an inner, thin wall tubular cavity closed at its opposite first and second ends by closure plates inclined at Brewster's angle, said mirror assembly means each including a cylindrical extension shell having a first end with a spherically ground surface for mating with said spherically ground mirror assembly means, a second end of each of said cylindrical extension shells being adjustably fitted over a respective first or second end of said inner cavity to allow lengthwise adjustment of said resonator, said mirror means being fastened in an adjustable position at said first end of said cylindrical extension shell to allow angular adjustment of said mirror with respect to a central axis of said resonator, said extension shell being cemented to said inner cavity.

2. A gas laser according to claim 1 wherein said extension shells form spaces on either end of said inner cavity, said spaces being bounded in each case by said extension shell, said closure plate inclined at Brewster's angle, and said mirror, said spaces defining outer cavities which are gas tight and which are filled with a gas which does not absorb laser radiation.

3. A method for the production of an elongated gas filled discharge tube means for a gas laser comprising the steps of providing an inner, thin wall tubular cavity closed at its opposite first and second end by closure plates inclined at Brewster's angle, fitting a first end of an open ended cylindrical extension shell over each end of said tube means, cementing said snuggly fitting extension shells to said tube means, said extension shells having an outer end opposite that from an inner end which is cemented to said tube means, said outer end having a spherically ground configuration, igniting the laser tube inner cavity, inserting mirrors having generally spherically ground outer portions into the ends of the extension shells by means of adjusting devices, aligning the mirrors for obtaining maximum ouptut power of the laser, and then cementing the mirrors in gas tight relationship with the extension shell and holding the mirrors by means of the adjusting devices until the cement hardens to hold the mirrors in place without the adjusting devices.

* * * * *